June 23, 1931.  F. J. SHOOK  1,811,567
VULCANIZER
Filed Dec. 9, 1926  2 Sheets-Sheet 1
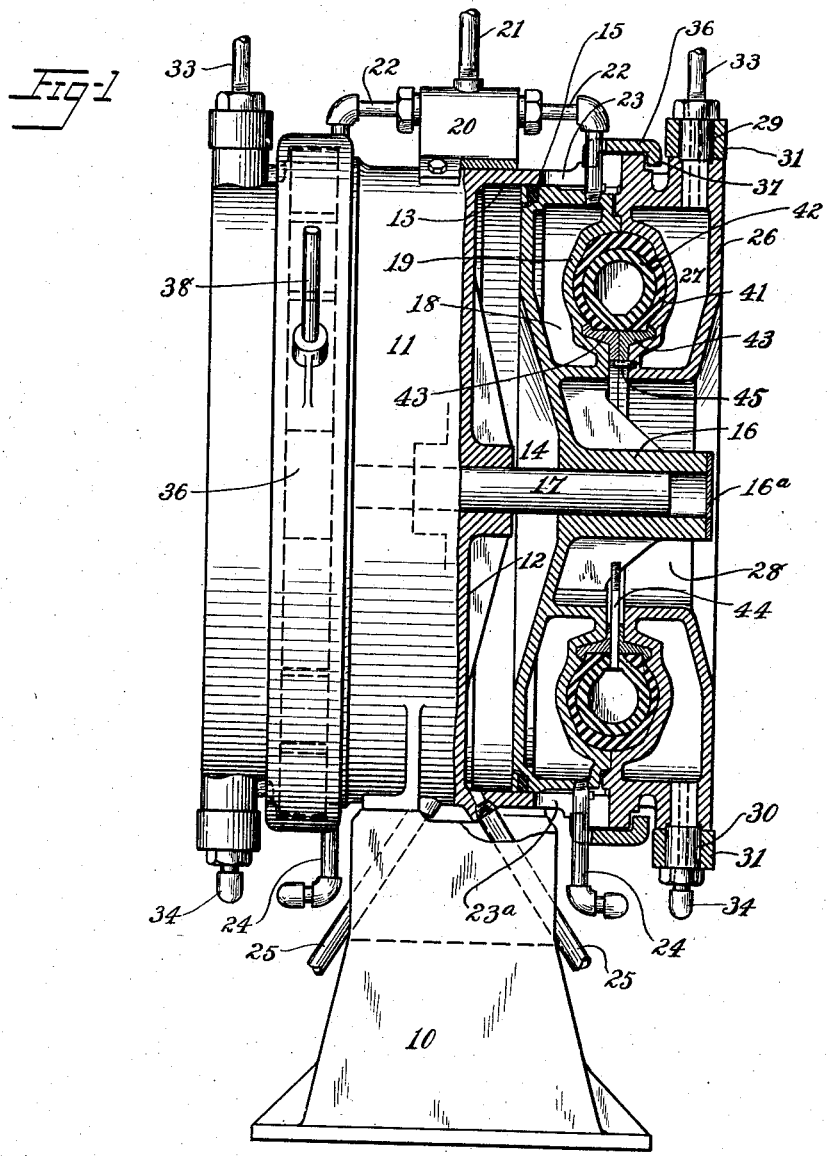
Inventor
Florain J. Shook
By Willard D. Eakin
Atty.

June 23, 1931.  F. J. SHOOK  1,811,567
VULCANIZER
Filed Dec. 9, 1926  2 Sheets-Sheet 2
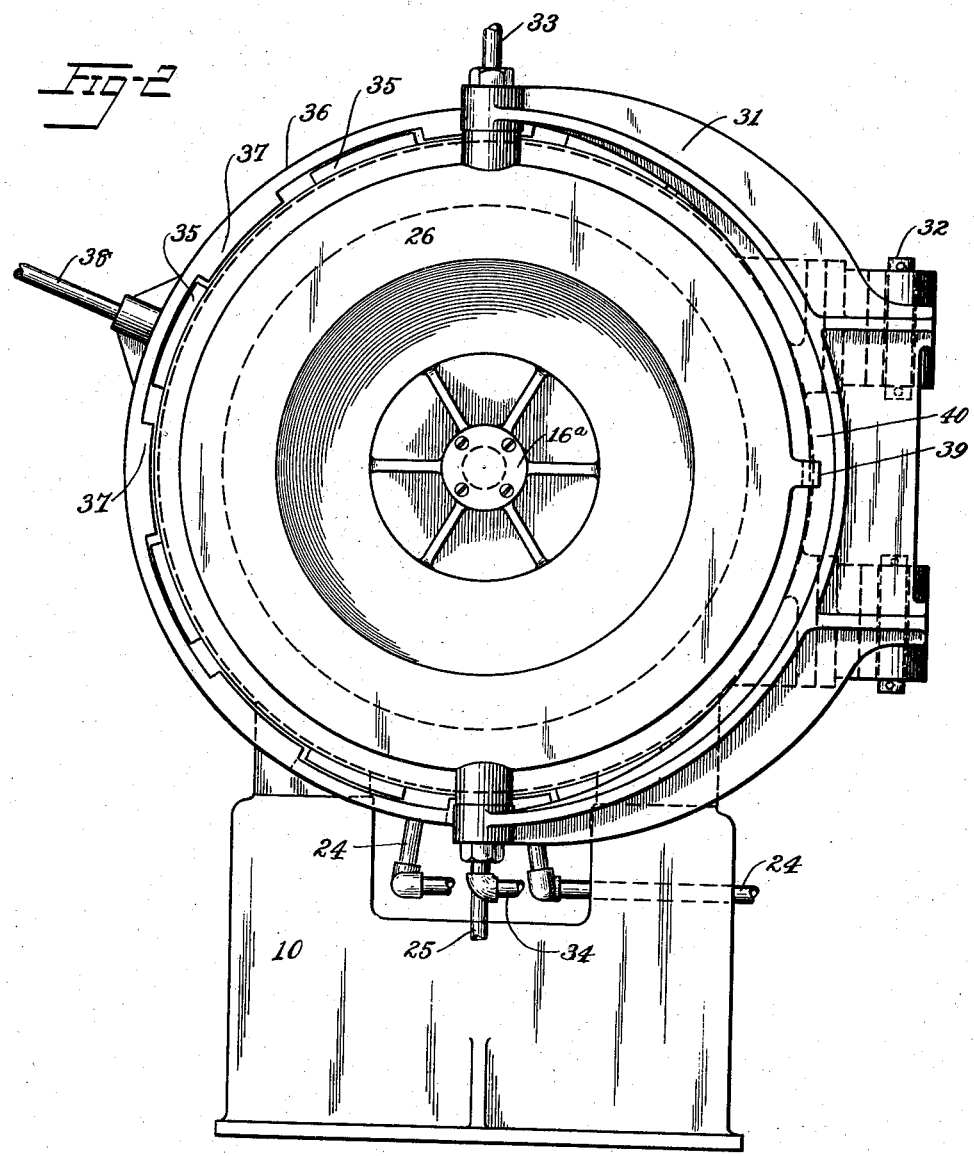
Inventor
Florain J. Shook
By Willard D. Eakin
Atty.

Patented June 23, 1931

1,811,567

UNITED STATES PATENT OFFICE

FLORAIN J. SHOOK, OF AKRON, OHIO, ASSIGNOR, BY MESNE ASSIGNMENTS, TO NATIONAL RUBBER MACHINERY COMPANY, OF AKRON, OHIO, A CORPORATION OF OHIO

VULCANIZER

Application filed December 9, 1926. Serial No. 153,563.

This invention relates to vulcanizing apparatus and especially to apparatus for vulcanizing tires or the like wherein means individual to each tire or other article is provided for enclosing the article and restraining it against internal fluid pressure so as to mold the exterior of the article in the vulcanization thereof, and wherein each article may be mounted and removed without releasing the molding pressure upon other articles, as in tire vulcanizers of the "watch case" type.

My chief objects are to provide a vulcanizer in which the successive tires or the like readily may be mounted and removed, and especially without the exertion of strong manual or other force for closing or for opening the apparatus; to provide in a "watch case" or similar individual vulcanizer the dependable and complete closure of the mold afforded by fluid-pressure mold-closing means; to provide the advantages of such mold-closing in conjunction with those of mold-locking means of the breech-block type; to provide for simplicity of steam or other fluid connections; and to avoid the unequal approach of one hinged mold-section to the other section such as has been present in watch case vulcanizers heretofore employed and consequently to avoid the tight closure of the mold sections upon the tire or the like at the hinge side of the device before the sections are fully closed at the diametrically opposite side of the device.

Of the accompanying drawings:

Fig. 1 is an elevation of a dual or two-cavity vulcanizer embodying my invention in its preferred form, the parts of the vulcanizer pertaining to one of the tire-cavities being axially sectioned and broken away, showing a tire therein.

Fig. 2 is an end elevation of the apparatus.

Referring to the drawings, the vulcanizer is so constructed and positioned that the plane or planes of its mold or molds are upright or vertically or substantially vertical, and it opens in a horizontal or nearly horizontal direction, thus affording advantages of convenience and minimum power requirements for operation, economizing space and permitting a pair of vulcanizers to be mounted back-to-back. The construction illustrated comprises a base 10 upon which is mounted a central cylindrical casting 11 constituting a frame member in the form of the casing or casing body and formed with a medial, cylinder-head web or partition 12 of at least as great and preferably greater diameter than a tire and with a cylindrical flange or cylinder-wall portion 13 extending in an axial direction each way from the outer periphery of the web 12 to form a chamber closed at one end and open at the other, the inner faces of said flanges being finished to constitute each of them a fluid-pressure cylinder for a large piston member 14 provided with a fluid-expanded packing 15 and formed with an elongated, axially apertured, central hub 16 slidably mounted upon a guide pin 17 projecting from the web member 12 at the latter's axis, the said pin 17 and the hub 16 being adapted by their sliding fit to guide and prevent cramping of the piston member 14 in the cylinder. A cap plate 16$^a$ may be mounted upon the end of the apertured hub to prevent leakage. Thus I provide a short stroke plunger of greater diameter than length, telescopically mounted in the open end of the cylindrical chamber.

Each piston member is formed with an annular steam chamber 18 surrounding its axis and defined on its outer side by a metal wall 19 of moderate and preferably substantially uniform thickness, the outer face of the said wall having the form of a tire-mold section, permissibly adapted to mold the tire by direct contact therewith, although I do not exclude the use of mold linings such as are well known for adapting mold cavities to tires of different sizes or of different tread designs.

Mounted upon the top of the casting 11 is a block 20 through which a steam supply pipe 21 has slip-joint connection with each of two pipes 22, 22 mounted in and communicating with the steam chambers of the respective piston members 14, the annular flanges or cylinder portions 13 of the casting 11 each being formed with a longitudinal slot 23 to permit the pipe 22 to move back and forth with the piston member.

A drain pipe 24 leads from the lowest part of each steam chamber and has suitable flexible or swivel connections (not shown) and the cylinder is slotted at 23ª to permit the pipe 24 to move with the piston member. A fluid-pressure supply pipe 25 leads into each of the cylinders 13.

At each end of the device, to cooperate with the adjacent piston member 14 to enclose the tire, a mold section 26 having an annular-steam cavity 27 and formed with a central opening 28 to accommodate the hub 16 of the piston member, is mounted, by axially apertured vertical trunnions 29, 30 at its top and bottom, between the arms of a crescent-shaped swinging bracket or yoke 31 which is hinged to the rear of the casting 11 upon a vertical axis at 32 (Fig. 2), the whole constituting a crane-type hinge. Said mold section 26 is thus arranged as a door and provided with an annular tire-molding cavity mating with that in the face of the piston member 14. The door structure body, including the steam jacket, thus constitutes a frame member hinged to the main frame or casing member 11 and provided with a mold section.

A steam supply pipe 33 leads into the steam cavity 27 at the top thereof, through the trunnion 29 and a drain pipe 34 has communication with the steam cavity 27 at the lowermost part thereof, through the trunnion 30, the pipes 33 and 34 having suitable flexible or swivel connections for circulating steam through the chamber 27 although permitting the mold section 26 to be swung with the bracket 31 upon the latter's hinge-axis 32.

For holding each of the mold sections 26 in close proximity and in parallel relation to the adjacent cylinder portion of the casting 11, the periphery of the mold section 26 is formed with outwardly projecting, spaced apart lugs 35, 35 and a locking ring 36 is rotatably mounted upon the casting 11 and formed with inwardly projecting, spaced apart lugs 37, 37 adapted to interlock with the respective lugs 35 of the mold section, the lugs 35 being adapted to pass between the lugs 37, with the locking ring properly indexed, in the reception of the mold section. The locking ring 36 is provided with a simple hand spoke 38 for turning it, as the construction is such that the locking ring may be engaged and disengaged with the lugs 35 of the mold section while the piston member 14 is retracted toward the center of the device, and the locking ring is required only to retain the mold section 26 and not to force it home in the final closing of the mold.

The locking ring 36 may be integral and may be readily mounted upon the integral casting 11 in the construction of the device by forming the casting with lugs so spaced apart as to permit the passage between them, with but little clearance, of lugs formed on the adjacent side of the locking ring, the lugs and spaces being of greater length than that of the lugs 35 of the mold section, mounting the ring upon the casting by such passage of the lugs, then slightly rotating the ring and thereafter inserting in the piston member the steam inlet pipe 22 to serve as a stop to prevent such return movement of the ring as to free the ring from the casting while still permitting such rotation of the ring as to permit its lugs 37 to lock and unlock with relation to the lugs 35.

The mold section 26 is preferably formed with a pair of lugs as at 39, Fig. 2, adapted loosely to straddle a flange 40 formed on the inner side of the bracket 31, to prevent extensive rotation of the mold section on its trunnions while permitting such limited bodily rotation as to permit the mold section to take its position against the piston member 14 independently of the hinge 32 of the bracket.

The tire is shown at 41, mounted upon an expansible core 42 and bead-clamping rings 43, 43, the core 42 being provided with the usual fluid-inlet stem 44 adapted to be connected with a suitable source of pressure fluid for distending the core and tire during vulcanization of the latter.

A stud 45 projects inward from a high part of the mold section 26, in position for hanging the tire assembly thereon in mounting the tire in the vulcanizer.

In the operation of the vulcanizer, assuming the piston member 14 to be withdrawn toward the middle of the device by the application of a partial vacuum to the cylinder 13 through the pipe 25, the mold section 26 to be widely opened out about the hinge axis 32 and the mold parts to be kept continuously hot by the circulation of steam therethrough, the tire assembly, including the bead-clamping rings 43 and the core 42, is hung upon the stud 45, the bracket 31 and with it the mold section 26 are swung against the adjacent cylinder portion 13 of the casting 11, the locking ring 36 is rotated to lock the mold section 26 against outward movement, and a pressure fluid, preferably compressed air, is admitted to the cylinder 13 through the pipe 25, which forces the piston member, as a mold-section, tightly against the mold section 26, and the air pressure preferably is left on to hold the mold sections together throughout the vulcanizing period. The core 42 is distended by connecting up its inlet stem 44 with a suitable source of pressure fluid, and thus the tire is distended and molded during vulcanization. The lugs 35, 37 provide for locking the mold section 26 at a multiplicity of points around its periphery, and the piston 14, being directly located on the back of its annular molding member, provides an even and tight closure all around the periphery of the mold, so that when the tire is expanded by fluid pressure admitted to the core 42, there will be a minimum of rind or flash from the softened rubber, extruded from between the mold sections.

At the end of the vulcanizing period the core 42 is vented, the air pressure is released from the cylinder 13 through the pipe 25 and suction is applied, which causes the external air pressure forcibly to move the piston member or mold section 14 away from the mold section 26, which releases the pressure of the latter against the lugs of the locking ring 36. With atmospheric pressure in the core 42 and a vacuum in cylinder 13, the core tends to expand and stretch the tire slightly and thus to "crack" or initiate the opening of the mold and break the adhesion between it and the tire at their outer periphery. Obviously this effect will be accentuated if the hydraulic or other pressure within the core is left on until after the cylinder is vented, and is of considerable value in loosening the tire from the mold and reducing the power which would otherwise be required to open the mold. Such effect is not obtainable where the cylinder and the interior of the tire communicate with each other and are subject to the same fluid pressure. Hydraulic or other fluid pressure may be employed in the cylinder 13 in place of compressed air, and it is not essential to apply a suction in said cylinder after discharging the pressure therefrom. When the mold-closing pressure behind the piston 14 has been relieved, the locking ring is then easily turned by hand to unlock the mold section 26, which is then swung widely open on the hinge 32, the tire is removed, and the operation as described is repeated.

Modifications are possible within the scope of my invention as defined in the appended claims.

I claim:

1. In a tire mold, a casing, a swinging door on said casing, a pair of mold halves, one of which is carried by the door, and means for moving one of said halves independently of the door.

2. In a tire mold, a casing, a mold half carried by said casing, a door hinged on said casing, a second mold half carried by said door, and means for producing relative motion between said halves independently of said door.

3. In a tire mold, a casing, a mold half carried thereby, a swinging door, a second mold half carried by said door, a locking ring for securing said door to said casing throughout its periphery, and means for producing relative motion between said halves independently of said door.

4. In a tire mold, a casing comprising fixed and swinging parts, a mold half carried by each of said parts, a piston attached to one mold half and a cylinder therefor carried by the corresponding casing part, whereby pressure in said cylinder will move one mold half in a direction normal to the plane dividing the halves.

5. In a tire-mold, a casing comprising fixed and swinging parts, a locking ring carried by one of said parts for securing them together at intervals throughout their peripheries, a mold half carried by each of said parts, a piston attached to one mold half and a cylinder therefor carried by the corresponding casing part, whereby pressure in said cylinder will move one mold half in a direction normal to the plane dividing the halves.

6. In a tire mold, a fixed casing body, a swinging door on said body, coacting means carried by said parts for securing them together at a multiplicity of points throughout their periphery, a tire-mold comprising mating sections mounted on said body and door respectively, fluid-pressure means on the casing body, coaxial with the mold sections, for effecting an even and tight closure of the mold all around its periphery, and means for supplying fluid pressure to the interior of the tire to expand the latter in the closed mold.

7. In a tire vulcanizer, a fixed casing body mounted in a substantially upright plane and having a cylinder on a substantially horizontal axis, a movable member having a piston in said cylinder, a tire-mold section attached thereto and an annular steam jacket, steam supply and drain pipes for said jacket passing respectively through the upper and lower walls of said casing body, a swinging door on said casing body having a mating mold section provided with a steam jacket, and means for locking said door to the casing body in closed position.

8. In a tire vulcanizer, a fixed casing body having a swinging door, means for locking said door, an annular mold section carried by the door, a cylinder on the casing body, a short-stroke member having a piston in said cylinder provided with a mating annular mold section, and circular guiding means on the casing body and piston member, coaxial with and of a different diameter than the piston, to prevent cramping thereof.

9. A vulcanizer comprising a hinged mold section, means for holding the same in a determinate position about its hinge axis, and a second, fluid-pressure-actuated mold section mounted to slide axially into and out of a mating relation to the first-said mold section while the latter is held in such position, said second section having a limited retracting movement sufficient only to initiate the opening of the mold, the hinge mounting having provision for permitting a bodily movement of the first section before its swinging-open movement substantially begins.

10. In a heater press, the combination of a pair of mating mold sections having an annular cavity, means for inflating an article in said cavity, a frame or casing having members carrying the respective mold sections and hingedly connected to effect a partial closing of the latter without substantial molding pressure, one of said mold sections being axially movable on its frame member, means for locking said members together when the mold sections are thus partly closed, and fluid-pressure means on the frame member which carries the axially-movable mold section, acting directly at the back of said section and effective over an area covering the joints at the inner and outer peripheries of the mold for independently effecting a final closing of the mold.

11. A vulcanizer comprising a mold section formed with an annular cavity, a fluid-pressure cylinder having a diameter at least as great as that of said mold section, locking means for holding said mold section and cylinder against separation, a piston in said cylinder provided with a mating mold section, and means having extended coacting guiding surfaces in the central region of said cylinder and piston to prevent cramping of the piston.

12. A vulcanizer comprising a bracket hinged upon a substantially vertical axis, a mold section pivoted upon said bracket upon a substantially vertical axis, means for holding said mold section in a determinate position, a second mold section, and cylinder-and-piston means for holding the second mold section in mating relation to the first mentioned mold section with the latter in such determinate position.

13. A vulcanizer as defined in claim 12 in which means is provided for limiting the movement of the first mold section about the axis upon which it is pivoted upon the bracket.

14. A vulcanizer as defined in claim 12 in which a locking ring is provided for holding the first section in vulcanizing position and in which fluid pressure means is provided for moving the second section from and toward it.

15. A tire vulcanizer comprising a cylinder mounted in a substantially upright plane and having a door hinged on a substantially upright axis, a piston in said cylinder provided with a co-axial, annular mold section, a mating annular mold section carried by said door, and non-wedging, circumferentially-arranged locking means co-axial with said parts and having circumferentially movable operating means for holding said door and its mold section against the thrust of said piston and the latter's mold section.

16. The combination of a pair of tire vulcanizers mounted back-to-back in substantially upright planes and each having a door hinged to swing outwardly on a substantially horizontal arc, an annular mold section carried by said door, a cylinder provided with a co-axial, annular, mating mold section, and co-axial, circumferentially movable locking means mounted forward of the rear end of said cylinder for holding said door in closed position while the mold is closed by said piston.

17. In a tire mold, a casing, a member co-operating with the casing, means connecting the casing and the member for relative swinging movement, means for locking the casing and the member in closed position, a pair of mold halves, one of which is carried by the member and the other of which is carried in the casing, and means for moving the mold half carried in the casing independently of the means for locking the casing and the member in closed position.

18. A heater mold comprising a cylinder having an open end, a fluid pressure actuated member mounted for reciprocating movement in the cylinder, a mold section in the cylinder carried by the fluid pressure actuated member, and a mold section removably secured to the open end of the cylinder whereby said fluid pressure actuated member forcibly mates said mold sections together to define a molding cavity.

19. A heater mold comprising a cylinder having an open end, a fluid pressure actuated member mounted for reciprocating movement in the cylinder, a mold section in the cylinder carried by the fluid pressure actuated member, a mold section removably secured to the open end of the cylinder whereby said fluid pressure actuated member forcibly mates said mold sections together to define a molding cavity, and means having extended co-acting guiding surfaces in the central region of the cylinder and fluid pressure actuated member to prevent cdamping of the fluid pressure actuating member.

20. A heater mold comprising a cylinder having an open end, a fluid pressure actuated member mounted for reciprocating movement in the cylinder, a mold section in the cylinder carried by the fluid pressure actuated member, a mold section removably secured to the open end of the cylinder whereby said fluid pressure actuated member forcibly mates said mold sections together to define a molding cavity, and circular guiding means on the cylinder body and fluid pressure actuated member, coaxial with and of a different diameter than the fluid pressure actuated member to prevent cramping thereof.

In witness whereof I have hereunto set my hand this 2nd day of December, 1926.

FLORAIN J. SHOOK.